Feb. 17, 1942.  G. D. MALLORY  2,273,364
FILAMENT
Filed Feb. 6, 1940
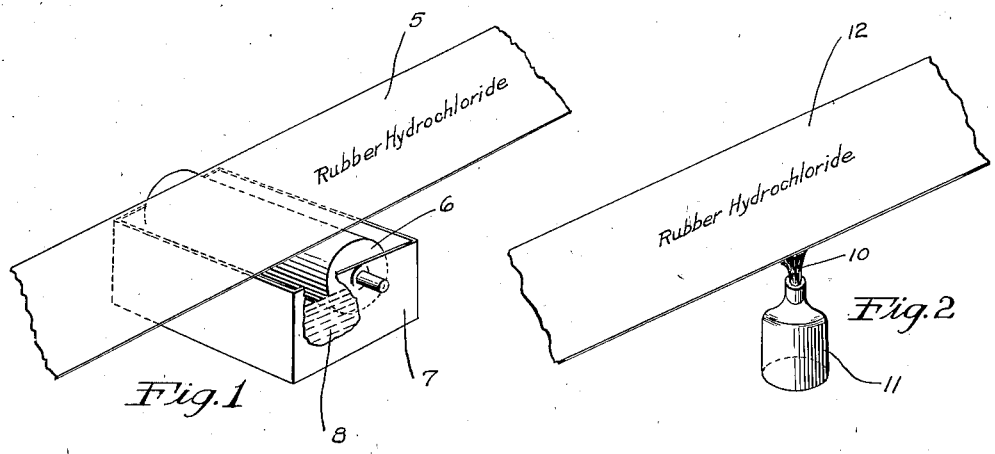
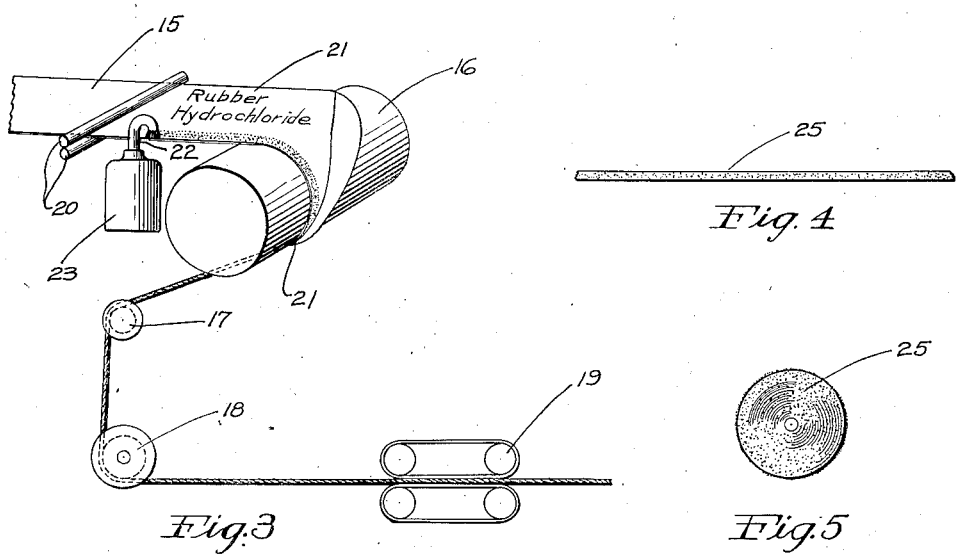
Inventor
Gerald D. Mallory
By
Attorney Patented Feb. 17, 1942

2,273,364

UNITED STATES PATENT OFFICE 2,273,364

FILAMENT

Gerald D. Mallory, Akron, Ohio, assignor to Wingfoot Corporation, Wilmington, Del., a corporation of Delaware Application February 6, 1940, Serial No. 317,512

1 Claim. (Cl. 18—54)

This invention relates to a filament of rubber hydrochloride and the method of making the same.

It has previously been suggested that filaments of rubber hydrochloride be made from rubber hydrochloride film by stretching and twisting or rolling the film. By rolling or twisting the film on a hot plate or heated cylinder, it is compacted into the filament. The heat softens the film and overlapping surfaces of rubber hydrochloride are fused together. The heat used for this fusion is advantageously likewise used to soften the rubber hydrochloride to aid in stretching it. It has, therefore, been the practice to pass the film over a heated roll and then roll or twist it while hot, preferably by pressing it against the roll and stretching it to effect fusion of the overlapping rubber hydrochloride surfaces.

There are various types of rubber hydrochloride film. For example, a large amount of the film on the market is plasticized to increase its tear resistance. Several per cent of butyl stearate or dibutyl phthalate are used for this purpose. Other plasticizers may be employed. Such plasticized film softens more readily and is more readily compacted when twisted or rolled after heating. Some filament produced in this way is not thoroughly compacted but contains voids. Furthermore, on flexing, filaments made in this way have been known to separate more or less at the points of fusion.

According to this invention, the film is treated with a cement or softened with a solvent before rolling or twisting to aid in compacting and in the adherence of overlapping layers. Furthermore, abrasive materials may be incorporated in or on the filaments when cement or solvent is thus employed.

The cement used for this purpose may be any one of the cements now employed in the industry for use with rubber hydrochloride film. Various latex adhesives are used for this purpose or an adhesive comprising a cyclized rubber in a solvent, such as gasoline, may be employed. Instead of using a cement, any solvent for the rubber hydrochloride, for example, chloroform, or chlor ethane, etc. may be used. Such solvents soften the film and rapidly make it sticky. Cements containing rubber hydrochloride solvents are of course satisfactory. Rubber hydrochloride solutions may be used.

The solvent or adhesive may be applied in any suitable manner. For example, a film may be dipped in a bath of the solvent or adhesive. As an alternative method, a film may be run over a roll which rotates freely in a bath of the adhesive. The roll thus brings the adhesive up to the film. As an alternative method, any suitable wicking device may be employed where solvent is used. An entire surface of the film may be coated or the solvent or adhesive may be applied to only one edge of the film which is the edge which will form the outer portion of the filament after rolling or twisting.

In the accompanying drawing,

Fig. 1 shows means for applying solvent or adhesive to one surface of the film;

Fig. 2 shows means for applying but a narrow strip of the solvent or adhesive to one edge of the film;

Fig. 3 shows diagrammatically mechanism for rolling the film into a filament;

Fig. 4 shows filament coated with abrasive; and

Fig. 5 is an enlarged cross section of the filament shown in Fig. 4.

In Fig. 1 the film 5 is passed over the roller 6 which dips into the receptacle 7 containing solvent or adhesive 8. As the film is passed over the roller the solvent or adhesive is brought up by the roller and deposited on the lower surface of the film. If solvent is employed, the film is almost immediately rolled and twisted before the solvent has evaporated. With adhesive some evaporation may be desirable. Where a heat-sensitive adhesive is used, the coated film may be dried to remove all of the solvent before the film is then again heated and rolled or twisted and stretched to form the filament.

In forming filament from film which has been treated on only one surface, it will generally be desirable to roll the film toward the treated surface so that if the rolling is uniform the outer surface of the rolled filament will be composed of the untreated film. This will be desirable except where solvent or adhesive is used to bind abrasive, etc. to the outer surface of the filament. In this case, it will be desirable to use solvent or adhesive at the edge of the film which is to form the outer surface of the finished filament.

Fig. 2 illustrates means for applying solvent to only one edge of the film. The wick 10 carries the solvent from the receptacle 11 to the film 12 as it travels to the twisting and stretching device.

Fig. 3 illustrates one type of rolling and stretching mechanism which may be used. The rubber hydrochloride film 15 is first passed over the heated roller 16. It is taken off one side of the roller and passed through a grooved roller 17 and then over the grooved wheel 18. In starting the operation the film is rolled on the bias from the right to the left on the roller 16 and is removed at the right-hand side of the roller 16 as a filament. The filament is not drawn back parallel to the strip of unrolled film, but is drawn to the left side of the roller at an angle of about 45°. When the film is rolled in this way, succeeding portions of the film are automatically rolled to a similar extent. By operating the pull rollers and belt 19 at a greater speed than the pinch rollers 20, the film may be stretched any desired amount in passing through the mechanism. The stretch, for example, may be three to one, or four to one. The surface temperature of the heated roll 16 may advantageously be about 160–170° F., more or less. This roll may be rotated at a surface speed of 100–120 ft. per minute. The shaded edge of the film 21 indicates film to which adhesive or solvent has been applied by the wick 22 from the receptacle 23. The amount of solvent or adhesive and the distance of the wick 22 from the roll 16 will be determined from the type of solvent or adhesive employed, the speed of the roll 16, etc. The operation should be so regulated that the edge 21 of the film is sticky as the film leaves the roller 16.

To make an abrasive-surfaced filament, such as that shown in Fig. 4, the filament may be treated with solvent or adhesive and abrasive, or with an abrasive-containing cement after the filament has been formed. A more satisfactory method, however, which gives a filament having a cross section such as that shown in Fig. 5, comprises treating the film with solvent or a suitable adhesive and dusting this with abrasive before rolling the film.

If preferred, the solvent or adhesive and abrasive may be applied to the outer surface of the filament during the rolling operation. By coating the entire surface of the film with abrasive before rolling and stretching the film, one insures the incorporation of the abrasive in the interior of the finished filament. In Figs. 4 and 5 the abrasive is indicated by the reference numeral 25.

Filament produced as described, without the application of abrasive, may be used for wrapping and tying packages, etc. It may be used for stringing rackets, such as tennis rackets, etc. It may be used for fish line and leaders. Filaments of varying sizes suitable for various uses may be thus produced. For example, the filament may range in size from 0.005 inch in diameter to 0.125 inch in diameter.

Filaments so formed may be cut to length and formed into brushes for various uses. These brushes are water-resistant and also acid- and alkali-resistant, as well as being resistant to various solvents, etc. Where abrasive brushes are desired, the abrasive-containing filaments will be used.

I claim:

The improvement in the production of filaments from rubber hydrochloride film produced by stretching and rolling or twisting the film, which comprises coating at least a portion of the film with abrasive before twisting or rolling the same.

GERALD D. MALLORY.